United States Patent [19]

Anastos

[11] Patent Number: 4,776,549

[45] Date of Patent: Oct. 11, 1988

[54] VISUAL EFFECT MAGNET HOLDER

[75] Inventor: Arleen R. Anastos, Yorktown Heights, N.Y.

[73] Assignee: Arjon Mfg. Corp., Hillside, N.J.

[21] Appl. No.: 103,942

[22] Filed: Oct. 2, 1987

[51] Int. Cl.⁴ .................... F16B 47/00

[52] U.S. Cl. .................... 248/206.5; 40/600

[58] Field of Search .................... 248/206.5, 222, 309.1; 211/69.1, 60.1, 50, 55, 13; 206/371, 224, 214, 483; 40/411, 584, 594, 596, 600

[56] References Cited

U.S. PATENT DOCUMENTS

| | | | |
|---|---|---|---|
| 2,202,300 | 5/1940 | Posnack | 211/50 |
| 3,124,501 | 3/1964 | Wise | 40/600 X |
| 3,304,042 | 2/1967 | Ivandick | 211/50 X |
| 3,612,292 | 10/1971 | Nervig | 211/55 X |
| 4,100,684 | 7/1978 | Berger | 21/50 X |
| 4,310,137 | 1/1982 | Frye | 248/205.3 X |
| 4,424,906 | 1/1984 | Richmond | 211/50 |
| 4,510,872 | 4/1985 | Parry | 211/50 X |

*Primary Examiner*—J. Franklin Foss

*Attorney, Agent, or Firm*—Marvin Feldman

[57] ABSTRACT

A magnet holder has vertically disposed front and back walls and a horizontal wall connecting the front and back walls, with complementary visual images on the front surfaces of the front and back walls, and magnets are mounted to the back of the front wall and to the bottom of the connecting wall, so that the holder is mounted on the top front edge of a refrigerator door, and when so mounted, the visual images provide a three-dimensional effect when viewed from the front.

11 Claims, 1 Drawing Sheet

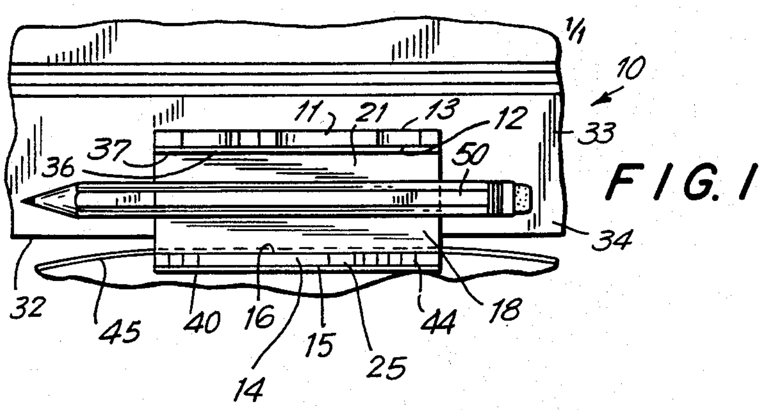
FIG. 1
FIG. 2
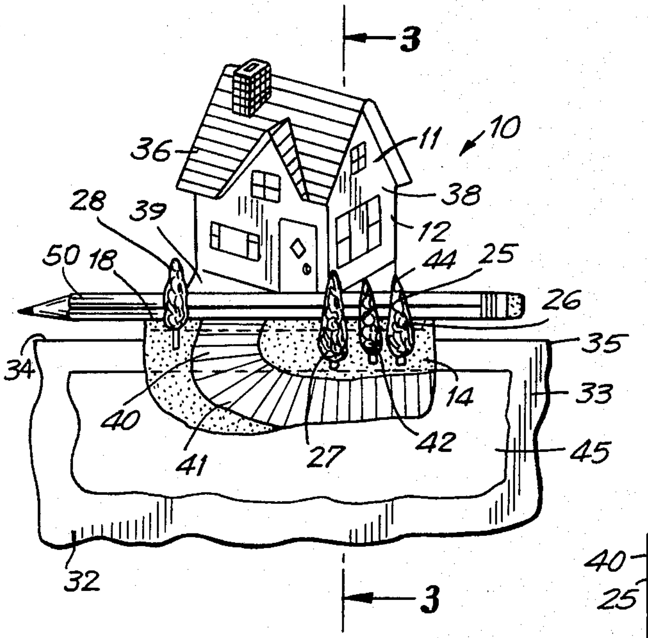
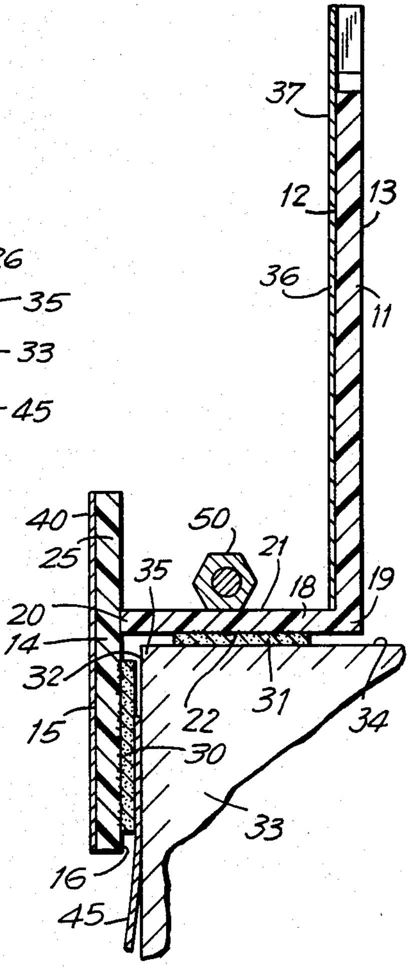
FIG. 3

VISUAL EFFECT MAGNET HOLDER

BACKGROUND OF THE INVENTION

1. Field of the Invention

This invention relates to magnet holders. Specifically this invention relates to magnet holder which provide a visual effect.

2. Discussion of the Prior Art

Magnet holders were made with a plastic body having a pictorial image on the front and a magnet mounted in the back. The image was decorative and essentially two-dimensional. The magnet was used to mount the holder vertically to the front of a ferrometallic door, such as a refrigerator door.

An attempt at providing a visual effect to a magnet holder was disclosed in commonly-owned, U.S. Ser. No. D-655,885, filed Sept. 28, 1984. This patent application disclosed the contouring of the body of the magnet holder to simulate a three-dimensional object.

The art, however, desired a dramatic three-dimensional visual effect in a magnet holder, as opposed to merely simulating a three-dimensional object.

The art also desired a more versatile magnet holder.

The art also desired a multi-functional magnet holder.

SUMMARY OF THE INVENTION

A magnet holder has vertically disposed front and back walls which are spaced from each other and joined by a horizontally disposed connecting wall. Magnets are mounted to the back of the front wall and to the bottom of the connecting wall for mounting the holder to the top front corner of a ferro-metallic door, such as a refrigerator door. Complementary pictorial images are provided on the front surfaces of the front and back walls so that the holder when viewed from the front provides a three-dimensional visual effect. The front wall desirably includes a portion which extends upwardly from the connecting wall, so as to be disposed directly in front of the back wall and a further complementary pictorial image is provided on the upwardly extending portion, so as to provide a dramatic three-dimensional visual effect.

BRIEF DESCRIPTION OF THE DRAWINGS

FIG. 1 is a top plan view of the magnet holder of the present invention;

FIG. 2 is a front elevational view of the magnet holder of FIG. 1; and

FIG. 3 is an enlarged sectional view taken along line 3—3 of FIG. 2.

DESCRIPTION OF THE REFRIGERATED EMBODIMENTS

Referring to the Figures there is shown the magnet holder of the present invention referred to as 10. Holder 10 is formed with a back wall 11 having a front 12 and back 13, and a front wall 14 having a front 15 and a back 16. Walls 11 and 14 are vertically disposed and are in parallel disposition. A connecting wall 18 is horizontally disposed and is formed with a back portion 19 which is connected to or formed with back wall 11, and a front portion 20 which is connected or bonded to the back 16 of front wall 14. Connecting wall 18 has a top 21 and a bottom 22. In this manner, the holder is formed as an integral unit, and it is within the contemplation of the invention to mold the walls as a one-piece integral molded plastic construction.

Front wall 19 is formed with an upwardly extending, vertically disposed portion 25, for purposes hereinafter appearing. Portion 25 is in fact a series of contoured shapes 26, 27 and 28, by way of example.

A first magnet 30 is bonded to the back 16 of front wall 14, and a second magnet 31 is bonded to the bottom 22 of connecting wall 18. In this manner of construction, magnet 30 attaches to the front 32 of refrigerator door 33 while simultaneously, magnet 31 attaches to the top 34 of door 33, so that the magnet holder is mounted and firmly held to the front corner 35 of refrigerator door 33.

A sheet of paper 36 having a first pictorial image 37, namely, a house 38 with front steps 39 is glued or bonded to the front 12 of back wall 11. A second sheet of paper 40 having a second pictorial image, namely, a curved pathway 41 and trees 42 is glued or bonded to the front 15 of the front wall 14. The pictorial 42 of the trees extends upwardly to and is coterminus with portion 25. And the tree shape is contoured to match the portion shape as at 44.

In this manner of construction, the holder 10 is mounted to corner 35 of refrigerator door 33. The viewer when viewing the holder from the front visualizes a three-dimensional effect of the pathway extending rearwardly to the front steps, with the trees disposed in front of the house. Of course, a broad range of visual effects are contemplated as being within the scope of the present invention, including by way of example, a figure with the torso and head on the front of the back wall and the lower part of the legs and feet on the front of the front wall to create the three-dimensional effect of figure sitting on the refrigerator with the legs dangling in front of the refrigerator.

It is to be noted that the magnet holder is multi-functional in that note paper 45 may be held between magnet 30 and the front 32 of the refrigerator door, while a pencil 50 or markers (not shown) may be held on the top 21 of the connecting wall 18 between the upwardly extending portion 25 and the back wall.

It is therefore to be understood that a broad range of modifications may be made within the scope of the present invention, and it is not intended that the present invention be limited by the specific embodiments previously discussed, but is to be defined by the adjoined claims.

What is claimed is:

1. A magnet holder comprising; a member comprising a back wall having a front surface and a back surface, and a front wall having a front surface and a back surface, and a connecting wall, said connecting wall including a back and a front portion and a top and bottom, and wherein the connecting wall front portion is joined with the front wall and the connecting wall back portion is joined with the back wall to form an integral member, said back wall front surface comprising a first pictorial image, and said front wall front surface comprising a second pictorial image complementary to the first pictorial image, so that when the holder is viewed from the front the second image complements the first image to provide a complementary visual effect, a magnet, and means for mounting the magnet to one of the back surfaces of the front wall and the bottom of said connecting wall, whereby the connecting wall is mounted on top of a ferro-metallic door with the magnet holding the member to the door.

2. The magnet holder of claim 1, said front wall and back wall being vertically disposed, and said connecting wall being horizontally disposed.

3. The magnet holder of claim 2, said front wall and back wall being in parallel disposition.

4. The magnet holder of claim 1, said front wall including a portion extending upwardly from the connecting wall, said upwardly extending portion comprising part of said second image.

5. The magnet holder of claim 4, said front wall and back wall being vertically disposed, and said connecting wall being horizontally disposed.

6. The magnet holder of claim 2, said front wall and back wall being in parallel disposition.

7. The magnet holder of claim 1, said walls comprising an integral plastic construction.

8. The magnet holder of claim 1, further comprising sheets of paper bonded to said front and back walls, said sheets comprising said images.

9. The magnet holder of claim 4, said top of said connecting wall comprising a storage space, disposed between said upwardly extending portion and said back wall.

10. The magnet holder of claim 1, further comprising a second magnet, with one magnet being mounted to the back surface of the front wall and the other magnet being mounted to the bottom of the connecting wall, so that the member is magnetically held to both the top and front of the door.

11. The holder of claim 1, wherein the pictorials are complementary so as to provide a three-dimensional visual effect.

* * * * *